US011326310B2

(12) United States Patent
Velazquez (10) Patent No.: US 11,326,310 B2
(45) Date of Patent: May 10, 2022

(54) CONCRETE AND MASONRY RESTORATION AND ORNAMENTATION METHOD AND APPARATUS

(71) Applicant: Donald Velazquez, San Diego, CA (US)

(72) Inventor: Donald Velazquez, San Diego, CA (US)

( * ) Notice: Subject to any disclaimer, the term of this patent is extended or adjusted under 35 U.S.C. 154(b) by 0 days.

(21) Appl. No.: 15/802,184

(22) Filed: Nov. 2, 2017

(65) Prior Publication Data

US 2018/0119365 A1 May 3, 2018

Related U.S. Application Data

(63) Continuation-in-part of application No. 15/243,794, filed on Aug. 22, 2016, now abandoned.

(60) Provisional application No. 62/208,469, filed on Aug. 21, 2015.

(51) Int. Cl.
| | |
|---|---|
| *E04B 1/00* | (2006.01) |
| *E01C 11/00* | (2006.01) |
| *E04G 23/02* | (2006.01) |
| *E01C 15/00* | (2006.01) |
| *G05B 19/402* | (2006.01) |
| *E04F 21/00* | (2006.01) |
| *E01C 23/02* | (2006.01) |

(52) U.S. Cl.
CPC ............ *E01C 11/005* (2013.01); *E01C 15/00* (2013.01); *E01C 23/025* (2013.01); *E01C 23/026* (2013.01); *E04F 21/00* (2013.01); *E04G 23/0285* (2013.01); *G05B 19/402* (2013.01); *G05B 2219/50118* (2013.01)

(58) Field of Classification Search
CPC .... E01C 11/005; E01C 23/025; E01C 23/026; E01C 15/00; E04F 21/00; G05B 19/402; G05B 2219/50118; E04G 23/0285
See application file for complete search history.

(56) References Cited

U.S. PATENT DOCUMENTS

| | | | | |
|---|---|---|---|---|
| 4,507,013 | A * | 3/1985 | Martinak | E01C 23/0966 404/134 |
| 5,251,999 | A * | 10/1993 | McCracken | E01C 23/06 404/109 |
| 5,333,969 | A * | 8/1994 | Blaha | E01C 19/46 404/102 |
| 5,405,213 | A * | 4/1995 | O'Connor | E01C 7/187 404/107 |
| 5,476,340 | A * | 12/1995 | Contrasto | E01C 7/147 264/35 |
| 5,746,539 | A * | 5/1998 | Mara | E01C 23/065 404/102 |
| 5,771,557 | A * | 6/1998 | Contrasto | E01C 7/147 264/36.2 |
| 6,052,964 | A * | 4/2000 | Ferm | E01C 7/147 404/64 |
| 6,491,472 | B1 * | 12/2002 | Lu | E01C 11/103 404/74 |
| 6,694,690 | B2 * | 2/2004 | Li | E01C 7/147 52/396.02 |
| 7,033,106 | B2 * | 4/2006 | Harvey | E01C 23/098 404/107 |

(Continued)

*Primary Examiner* — Basil S Katcheves
(74) *Attorney, Agent, or Firm* — Mark Wardas (57) ABSTRACT

A method and apparatus are provided to rehabilitate and beautify cracked concrete surfaces by adding channels to the surface.

16 Claims, 7 Drawing Sheets

(56) References Cited

U.S. PATENT DOCUMENTS

| | | | | |
|---|---|---|---|---|
| 8,167,513 B2* | 5/2012 | Ryan | ................. | E01C 23/06 |
| | | | | 404/101 |
| 8,377,348 B1* | 2/2013 | Montemayor | ........ | E01C 11/005 |
| | | | | 264/36.1 |
| 8,567,146 B2* | 10/2013 | Hemphill | ............ | E04G 23/0218 |
| | | | | 52/514.5 |
| 8,683,773 B2* | 4/2014 | Emmons | ............ | E04G 23/0203 |
| | | | | 52/2.13 |
| 9,416,499 B2* | 8/2016 | Cronin | ................ | E01C 23/01 |
| 9,588,315 B1* | 3/2017 | Turner | ................ | G02B 6/443 |
| 9,963,870 B2* | 5/2018 | Merlob | ................ | E04B 1/41 |
| 10,041,213 B2* | 8/2018 | Giles | ................ | E01C 11/005 |
| 10,240,306 B2 | 3/2019 | Lorenz | | |
| 2014/0137503 A1* | 5/2014 | Wheatley | ............ | E04G 23/0214 |
| | | | | 52/514.5 |
| 2014/0272250 A1* | 9/2014 | Dirkson | ................ | E04C 2/04 |
| | | | | 428/63 |
| 2015/0200026 A1* | 7/2015 | Kuntz | ................ | G21C 13/028 |
| | | | | 376/203 |
| 2016/0032540 A1* | 2/2016 | Reda | ................ | E01C 11/005 |
| | | | | 404/75 |
| 2016/0305076 A1* | 10/2016 | Doan | ................ | B28D 1/14 |
| 2016/0362901 A1* | 12/2016 | Tabatabai | ................ | E02D 37/00 |
| 2016/0376752 A1* | 12/2016 | Yun | ................ | E01C 7/147 |
| | | | | 404/75 |

* cited by examiner

CONCRETE AND MASONRY RESTORATION AND ORNAMENTATION METHOD AND APPARATUS

PRIORITY INFORMATION

This Application claims priority to U.S. Provisional Application No. 62/208,469, filed 21 Aug. 2015. This application is also a continuation in part from U.S. Patent Application No. 2017/0051522, filed 22 Aug. 2016.

FIELD OF THE INVENTION

The present subject matter relates to ornamentation, repair, and restoration of masonry bodies including concrete and tile. More particularly it relates to a method and apparatus for imparting channels or scoring cementitious surfaces to form designs therein to decorate new and existing surfaces and to rehabilitate existing cracked surfaces to render them more aesthetic.

BACKGROUND

Masonry bodies include such objects as house walls, driveways, patios, swimming pool walls, fountains, walkways, highways, and tilt-up construction. These bodies generally include concrete and other cementitious surfaces. Concrete bodies are subject to cracking, as for example due to settling of ground beneath the bodies. Such cracks may have a depth of inches. Further, such cracks are unsightly and are hazardous to people walking on the concrete. Simply filling such cracks by patching concrete leaves the appearance of a patched surface with seams of filled concrete or silicone or the like, being highly visible as if an advertisement that a crack was present and has been patched.

Overlay repairs intended to emulate set-stones may not provide a flat surface, and they may provide the same chance of tripping, breaking heels, and stubbing toes that occurs with many natural stone surfaces. Ornamental restoration may be done using stamp overlay products intended to place a layer to cover repaired or previously cracked surfaces. The objective of prior art methods, which is often unsuccessful, is to eliminate cracks or patterns. However, such prior art methods do not include the integration or use of existing cracks as a portion of the ornamentation while creating the appearance of patterns in the body or surface. Further, such prior art methods and devices, do not allow for the pre planning of a decorative surface using existing cracks as part of an overall design imparted to the concrete surface.

Many conditions can lead to exacerbation of concrete faults. Weeds or more sturdy vegetation tend to begin growing in cracks. The roots become well entrenched. This gives the property a dilapidated look. Growth of the vegetation tends to induce further cracks. In northern climates, snow will melt into cracks, leaving water in the crack. When the temperature drops, the water expands as it turns into ice, further stressing cracks. Further deterioration of the concrete body commonly results.

Many products exist for use in crack repair methods and concrete resurfacing. These products include Super-Krete® and Quik-Crete® concrete mixes. Such products are intended to provide for mechanical integrity of a concrete body. They are not intended for making the repaired surface look like anything other than a repaired surface. Overlay products are intended for ornamentation and can be stamped or textured. These products can be applied in varying thickness from about 1/16" to 1/2" or thicker, with 1/4" being common.

However, prior art methods are not focused on creating ornamentation in combination with repair and restoration to render the repaired surface to appear as planned or original. In many applications, it is highly undesirable to provide the appearance of a repaired surface which while appearing repaired, also is viewable as decorative and quite possibly original. For example, a very important quality of a house for sale is "curb appeal," i.e., how attractive the property looks as a sales prospect drives up. Flaws in the appearance of the driveway tend to decrease the price and the value of the property. Complete replacement of the driveway, as a practical matter, is not cost justified.

Prior art techniques include creating the appearance of grout-like joints or actual grout joints. Workers may be required to be constantly bent over during certain operations, which can cause orthopedic problems as well as exhaustion and dehydration. There are power tools that allow a worker to stand. However, certain finishing operations still require a worker to bend over to work at ground level. Techniques generally require tools that operate at high speed and which provide a greater risk of injury to workers who are placed near the tools by this bent or stooped work requirement. Further, such risk causes higher insurance costs for contractors. However, prior art techniques which teach repair or decoration of cementitious and stone surfaces and the like, each have particular shortcomings.

United States Published Patent Application No. 20140272250 discloses a slab of building material in which a fill component is placed in a void. The slab may comprise a first body that is adhered to another body. The bodies may be comprised of natural stone, wood, or other material. This disclosure is directed toward making a new slab out of broken pieces of other slabs. It is not a method or device for repair cracks in a cementitious surface nor is it is not directed to repair and remediation in a manner rendering the slab aesthetically pleasing.

United States Published Patent Application No. 20150191398 discloses a method for forming patterns on a surface of a hydraulic binder composition with a stencil. After setting of the surface and removal of the stencil, a friable delayed concrete layer in the pattern of the stencil remains. The deposited surface is later washed away to leave a pattern in concrete. Although this method provides for forming a pattern, this method does not allow for remediation of the unfinished appearance of repaired or broken surfaces. The pattern is not coordinated with preexisting lines, e.g., cracks, in a surface and the secondary layer imparted to the original is prone to chipping or delaminating.

United States Published Patent Application No. 20140248460 discloses a method for concrete crack repair in which a saw cut is made next to an open shrinkage crack. Expansive mortar is placed in the saw cut. As the mortar sets, it expands. The expanded mortar shifts the saw cut toward the shrinkage crack to make the crack narrower. However, the crack is not treated and does not become part of a remediation solution.

U.S. Pat. No. 5,310,780 discloses compositions for staining concrete. These compositions are useful in coloring different bounded areas within a pattern. However, a process for making a pattern is not disclosed. United States Published Patent Application No. 20040151950 discloses a method in which stains are applied to different sections of a concrete test slab however no means for forming a decorative pattern is disclosed.

SUMMARY

As such, there exists an unmet need, for a system for a method and apparatus for the repair of cracked concrete, stone, tile and other surfaces. Such a system should employ methods for engraving or imparting tooled patterns to the concrete or stone surface, which employs existing cracks to form a final viewable surface which disguises the existing cracks and imperfections to appear as part of a planned or original surface. Such a system should employ a device which imparts engraving or channels into the surface being repaired, wherein the user is either upright and at a safe distance from the tool, or where the tool is engaged with a robotically moved mount, which employs electronic navigation within the defined borders of the area to be repaired, to impart patterns into the surface being repaired. Employing this robotic or remote controlled mount for the tool employed for surfacing, such a system can allow the user to impart virtually any pattern into a new surface or surface being repaired, to thereby place virtually any image into the surface. Still further, such a device enabling the method herein, should be easily operated either manually, or by remote control, to thereby allow widespread use by both homeowners and contractors to impart designs into both new surfaces and old surfaces being repaired.

An object of the present invention is the provision of a system enabling the etching or engraving of concrete, stone, and similar surfaces, to impart indicia in the form of designs and images thereto.

It is another object of the invention to provide such a system for imparting designs into surfaces which allows for imparting designs to new surfaces of virtually any choice of design, and imparts designs to surfaces being repaired, which employs existing cracks and imperfections as part of the finished design.

Further objectives of this exercise invention will be brought out in the following parts of the specification wherein the summary and detailed description of the invention are for the purpose of fully disclosing the invention without placing limitations thereon.

In accordance with other aspects of the present invention, a method and apparatus are provided to rehabilitate and beautify new and cracked concrete surfaces, in a cost-effective and sustainable way, minimizing the resources utilized in forming a replaced surface and obviating the need to remove and replace a concrete body. The apparatus enabling the method herein, includes a powered cutting tool for forming channels in the surface, such as by routing, scoring, or cutting using tool accessories capable of achieving such functions. Such powered cutting tools as herein defined, may include drills, rotary hammers, impact drills, jack hammers, grinders, oscillating tools, vibrators, routers, saws, granite cutters, concrete engraving tools and more. The selection of tool is made in accordance with the desired appearance of a finished product.

The tool is supported to a movable tool. The movable tool can have wheels, glides, or casters to allow movement. The tool may be self-propelled and autonomous and move according to an electronic map held in computer memory, or a handle may be supported to the tool at a selectable height to enable a worker to stand up straight while operating the tool. Smaller versions with or without wheels may be used on vertical surfaces.

In use, a cracked concrete surface is evaluated and a desired remediation is selected using either electronic imaging of the surface and its perimeter area, or rendering a drawing of the surface to be repaired. The remediation comprises forming a pattern into the surface to be repaired, which includes the cracks in the concrete or stone or other surface, as part of the finished image or design formed into the repaired surface.

To that end, channels are formed in the concrete in accordance with a guide pattern determined either using a manual or self-propelled autonomous tool that follows the guide to impart them, on the surface to be repaired. These channels can vary in depth, width, and length in accordance with the design of the chosen pattern of the image to be imparted to the surface being repaired or to a new surface.

One available image or pattern can impart the channels to form a masonry surface appearing to have stones set individually. However, the system using the automated mode, can impart virtually any image into the surface being repaired or decorated. A substantially flat finished or repaired surface may be provided by the formation of the channels into the surface which are slight, but still noticeable to the human eye when viewed.

Forms of masonry on which the channels of the system herein can be used include driveways, sidewalks, walkways, patios, sidewalls, floors, entries, foyers and much more. The system herein however allows such repairs to be accomplished in a more cost-effective and 'sustainable' way, because rather than jack hammering and removing the surface, the existing cracks and imperfections may be employed as part of a finished pattern, image, or design, or they may be employed along with a random, natural-appearing pattern that allow a user to 'hide the problem in plain sight' and turn defects into art.

In one embodiment the present invention comprises: a method of decorating a concrete or cementitious surface having one or more preexisting fissure via formation of channels in the surface, comprising the steps of: positioning a machine over the surface, wherein the machine is configured to form the channels; determining placement positions for the channels in the surface; and forming channels in the surface with the machine, wherein after the step of forming channels, the surface comprises the channels and the one or more preexisting fissure. In one embodiment, the step of forming comprises forming the channels in an area of the surface that does not comprises the one or more preexisting fissure. In one embodiment, the step of forming comprises forming the channels in an area of the surface that comprises the one or more preexisting fissure. In one embodiment, the invention further comprises a step of determining a position of one or more preexisting fissure in the surface with an optical detector. In one embodiment, the optical detector is part of the machine. In one embodiment, the present invention further comprises a step of positioning a guide on the surface. In one embodiment, the guide is comprised of a plurality of non-linear lines. In one embodiment, at least some of the channels extend from the preexisting fissures. In one embodiment, the optical detector is coupled to a computer that is configured to drive the machine along the placement positions. In one embodiment, the machine comprises a tool configured to form the channels. In one embodiment the machine is driven along the guide to form the channels. In one embodiment the invention further comprises determining the placement positions with a sensor; storing the placement position in an electronic memory of a computer; creating a guide based on the placement position and storing the guide in the electronic memory; communicating the guide to the machine to cause the machine to form the channels.

In one embodiment, the present invention comprises a concrete or cementitious surface defined by a surface area comprised of: a plurality of preexisting fissures formed by an expansion or contraction of the surface area; a plurality of channels formed separately by a machine, wherein the channels are used to decorate the surface area. In one embodiment, at least some of the channels extend from the preexisting fissures. In one embodiment, the surface area is selected from the group consisting of: a driveway, a patio, sidewalk, and a walking path.

In one embodiment, the present invention comprises a system for decorating a concrete or cementitious surface having one or more preexisting fissure, the system comprising: a machine, wherein the machine is configured to form channels in the surface; a detector for determining a location of the one or more preexisting fissure; a computer functionally coupled to the detector and configured to determine placement positions of the channels in the surface; a guide configured to direct the machine along the surface to form the channels in the surface based on the placement positions. In one embodiment, the machine comprises a motor. In one embodiment the machine comprises a tool accessory configured to form the channel. In one embodiment, the placement positions extend from the preexisting fissures. In one embodiment, the machine is selected from the group consisting of a: rotary hammer, impact drill, jack hammer, grinder, oscillating tool, vibrator, router, saw, granite cutter, and engraver.

DETAILED DESCRIPTION

In this description, any directional prepositions if employed, such as up, upwardly, down, downwardly, front, back, first, second, top, upper, bottom, lower, left, right and other such terms refer to the device or depictions as such may be oriented are describing such as it appears in the drawings and are used for convenience only. Such terms of direction and location are not intended to be limiting or to imply that the device herein has to be used or positioned in any particular orientation.

Now referring to drawings in figures herein, wherein similar components are identified by like reference numerals, the present subject matter relates to a method, process, and system to remediate and/or beautify cracked concrete surfaces, in a cost-effective and sustainable way, minimizing the resources utilized to provide a replaced surface and obviate the need to replace a concrete body. This technique can create a genuine or more natural rough edge than most manufactured products. In the method herein, channels are formed in the concrete to create an pattern thereupon, and in doing so, to incorporate the preexisting cracks into the pattern.

The channels may vary in depth, width and length, depending on the desired pattern to be imparted to the surface, as well as the budget for such surfacing. Using either the manual or automated device herein to employ the method herein disclosed, skilled and even semi-skilled users can make masonry surfaces appear as stones set individually. Using the automated system herein employing the self-propelled tool which is autonomous and will move the tool and mount, according to an electronic map held in electronic memory, the tool employed can impart virtually any image or design into any horizontal or vertical surface.

Figure 11:
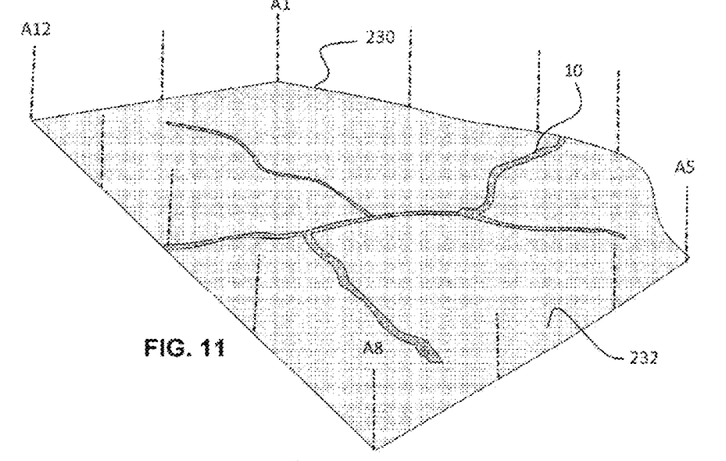
FIG. 11 shows a graphic plot or depiction of the perimeter of an existing surface with the existing fissures in the surface.
Figure 12:
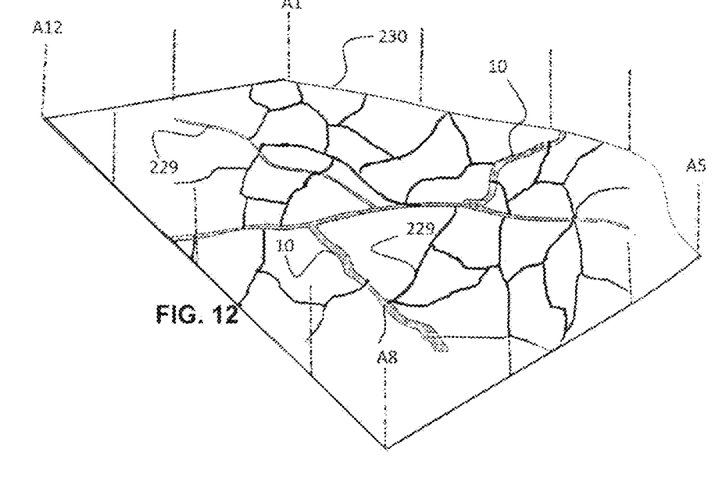
FIG. 12 depicts channels which are formed used by a powered tool with electronic memory, to impart the channels to the surface.

The self-propelled system herein for imparting channels into the surface can accomplish such in a matter of hours using onboard computer memory and software running therein configured to steer a tool and if needed translate the tool to form the pattern in the driveway which has been predetermined as shown in FIGS. 11 and 12 for example. A skilled operator using the manual system such as in FIG. 6, can transform an average-size driveway or patio within a day, while comfortably standing, holding onto handlebars with little exertion. Masonry work can be done in a manner that is safer than prior art methods. Tools that operate at relatively low speed can be employed, or at high speed when the autonomous self-propelled tool is forming the image or pattern.

Figure 1:
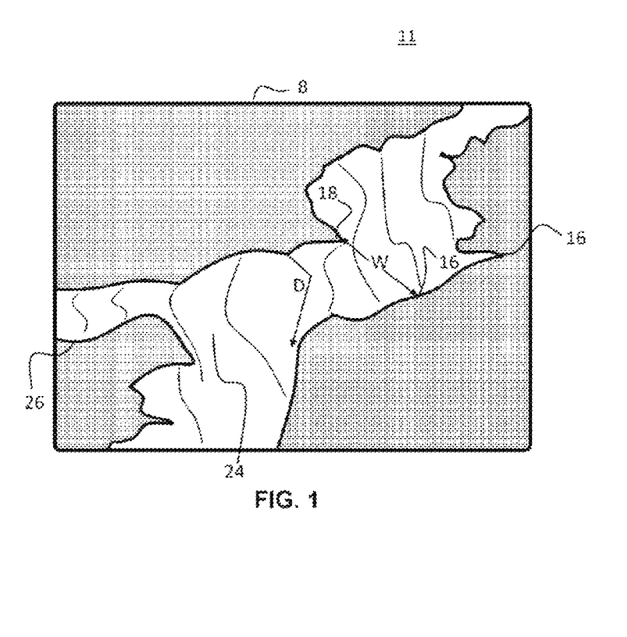
FIG. 1 is a detailed perspective view of a crack in a concrete body, such as a driveway.
Figure 2:
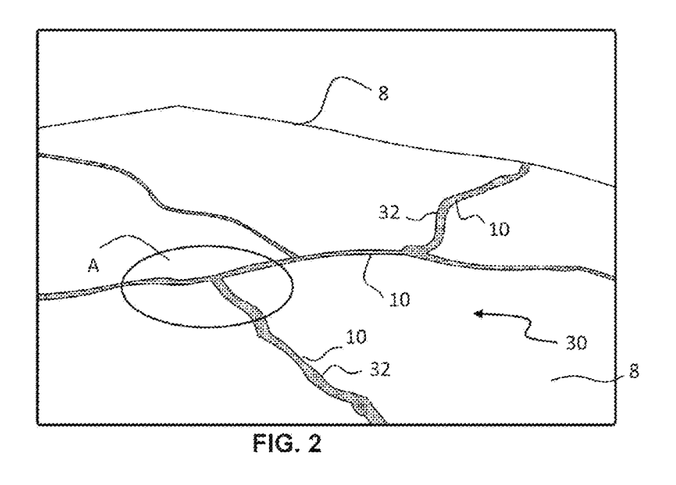
FIG. 2 is a perspective view of a cracked driveway.

FIG. 1 depicts a detailed perspective view of a crack 11 in a concrete body such as a driveway, and more particularly a perspective view of an area A of FIG. 2. The crack 11 is positioned in a concrete body such as a driveway 8. The crack 11 comprises one or more fissures 10 extending into an upper surface 12 of the concrete body 4 and away from at least one crack.

At any particular position along each crack 11, it has a width W between opposite sides 16 and 18. Each crack 11 forming a fissure has a depth D. The depth D corresponds to the height of a fissure sidewall 24. Such fissure sidewalls 24 are usually irregular and may be disposed at any one of a number of angles with respect to a vertical axis at different positions along the length D. The intersection of the upper surface 12 and such a sidewall 24 is referred to as a corner 26. The term corner as used herein is used for convenience in description. In virtually all cases, the corner 26 will be a rounded rough edge rather than an intersection of planes.

FIG. 2 is a perspective view of a cracked driveway 8. A plurality or group 30 of fissures 10 formed from cracks, may be the result of settling of ground beneath the driveway 8 or any of a number of other causes. In prior art techniques, such fissures 10 may simply be filled with patching concrete 32. However, such is less than aesthetically pleasing since even with the fissures 10 filled, the driveway 8 appears damaged and simply patched, and the patching in this fashion simply advertises to viewers that this driveway was cracked in the past and a repair has been attempted.

As can be discerned, this prior art method of repair does virtually nothing to improve curb appeal or value of a property. The visual redundancy of cracks running through the concrete and the discolored repairs, makes the cracks particularly noticeable to the naked eye.

Figure 3:
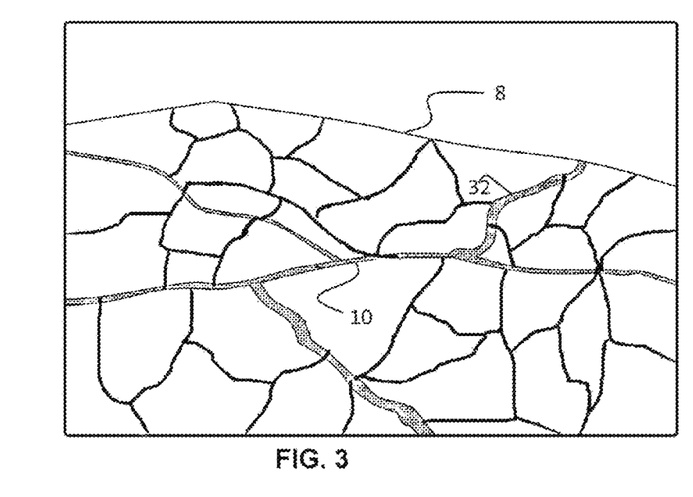
FIG. 3 is a perspective view of a channels formed in combination with pre-existing cracks in the driveway.
Figures 7, 8, 9:
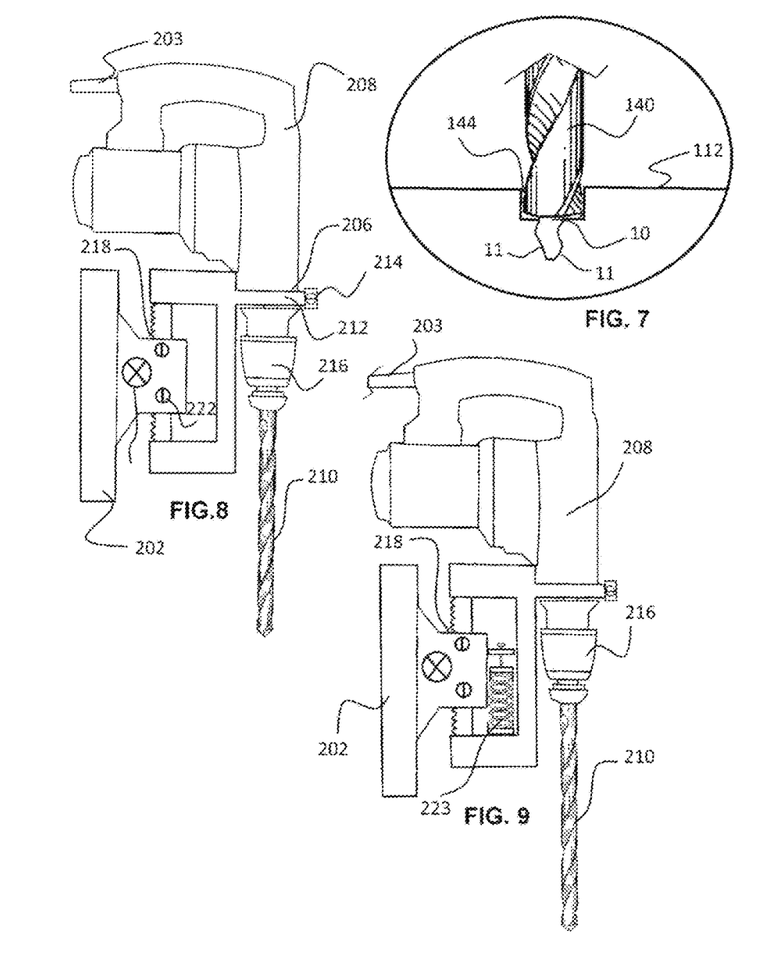
FIG. 7 depicts a distal end of an engraving tool forming a channel above a crack in the surface.
FIG. 8 depicts a mount used herein with a tool powering an engraving tool.
FIG. 9 shows the mount of FIG. 8 but having a biasing component.

FIG. 3 is a perspective view illustrating the driveway 8 which has been repaired using the method and device herein in either the manual mode or automatic mode. In accordance with the present subject matter, the original group 30 of fissures is employed as the basis for providing an improved and ornamented appearing driveway. As shown in FIG. 2 and FIG. 8, using the method and device herein, a simulated set stone arrangement is created on the driveway surface. This is a preferred and desirable style in the context of masonry where such is positioned on real estate, and real estate improvements. Other forms of driveway finish, such as a composition of planar colored shapes may be provided in further embodiments.

As shown, in all modes of the system herein, the group 30 is used as the basis for a design of a pattern for formation into the surface. By this employment of the group 30 of fissures 10 to incorporate them in a pattern, the original fissures 10 are visually transformed from an eyesore to part of a design. The pattern extending from and around an original group 30 of fissures, is formed of channels laid out to simulate borders of set stone. The lines define individual areas 46 bounded by channels, which as depicted simulate a stone surface, however, it is understood the patterns which can or may be formed by continuous or interrupted lines.

In a method herein employing the device shown, a channel 229 may be formed in any of a number of ways, including by following a guide that provides a path for the user to follow with the tool. In one mode of the method herein, the guide may comprises lines drawn or otherwise temporarily formed such as with tape, onto the surface. Faintly depicted or inscribed lines may be sufficient to allow further process steps using the manual mode of the method herein. If more precision is desired in forming the channels, a grid pattern may be determined and included in a guide map to allow an installer to determine and manually mark significant points needed to create the channels. It is understood that channels can be created to comprise any shape, including completely curved, completely straight, curved, jagged, or a combination of curved straight, curved, and or jagged.

Figure 4:
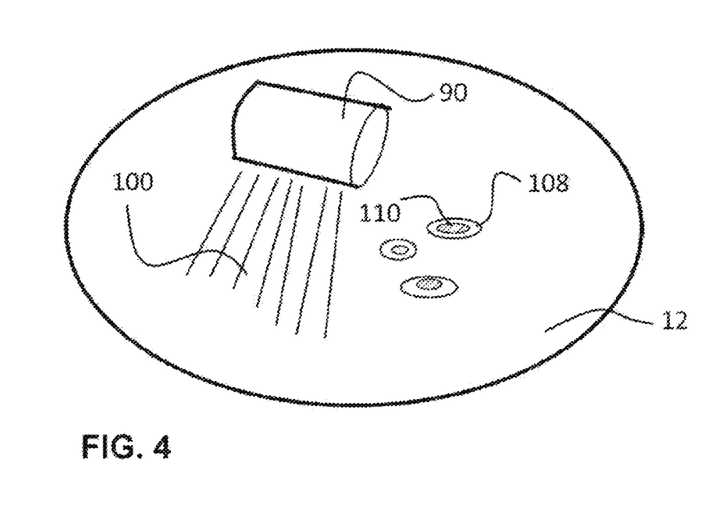
FIG. 4 shows a depiction of a surface being leveled and repaired with filler.
Figure 5:
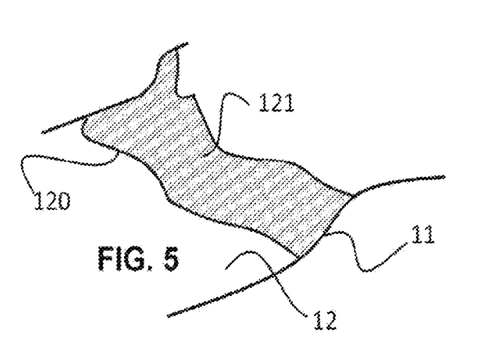
FIG. 5 shows a fissure which has been filled and ready for overlay or placement of adjacent channels.

FIGS. 4 and 5 are each a perspective view of a small portion of the driveway 8 having the surface 12. In some cases, prior or after formation of channels, the surface 12 is prepared. While other orders of steps may be used, it is found that in many cases an order is preferred. As seen in FIG. 4, in a first step, the surface 12 is leveled. This may be accomplished by scarifying the surface 12 using a tool 90 to produce a scarified area 100. Alternatively or additionally, patches 110 are filled into holes 108 in the surface 12. A next step comprises further preparing the surface 12 for an overlay of material if such is to be employed to cover both the original cracks and fissures and/or channels. Further preparation may include such things as application of cleaning liquids or primer.

Shown in FIG. 5 the cracks are filled and in order to fill some of the fissures, forms 120 may be placed in the cracks 11 to project slightly above are even with the top surface of the cracks 11 to mark their positions. Filler material 121 is applied to fill the volume in each crack 11 such may be cement, polymeric material, or other filler suitable to the task. Alternatively, a thin layer of overlay material 130 may be used that will leave a depression 131 over each crack 1. A similar procedure may be applied after channels are formed.

Figure 6:
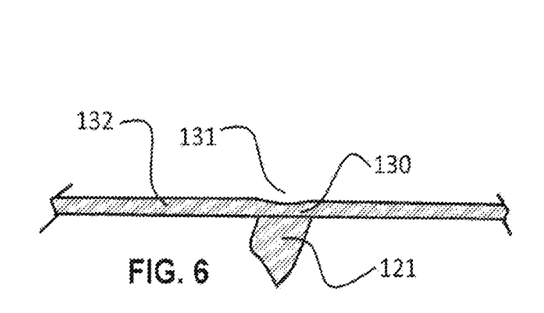
FIG. 6 depicts a sectional view showing a filled fissure and overlay material.

Shown in FIG. 6 is a typical cross-sectional elevation of application of an overlay material 130 to the driveway. As seen in FIG. 6, an overlay material 130 is applied to form an overlay 132 of an underlying filled crack and/or channel.

The overlay material 130 also provides a vehicle for receiving color. The overlay material 130 comprises concrete or a concrete composition, or can comprise a polymeric surface material. Different overlay compositions may be used to accommodate climate conditions, expected load, and expected wear. A nominal range of thickness of the overlay 132 is 1/16 to 1/4 inch. Different thicknesses may be required for other compositions. The overlay material preferably has a light color in order to facilitate application of other colors. The overlay material 130 is stained and sealed. Various concrete stains could be used. In the example of a driveway, sealing extends surface life. The appearance of decorative concrete is improved by enhancing the color and sheen.

High gloss sealers may be slippery. Acrylic sealers are generally preferred. The acrylic sealers may be blended with epoxies, polyurethane, or silicones to improve performance, durability, and water resistance. Other types of topical sealers for driveways are polyurethane, epoxies, and penetrating resins. Generally, epoxy or polyurethane sealers cost considerably more than acrylics and they tend to be higher build, and thus more slippery. They also don't allow for moisture vapor to move out of the concrete. It's important that sealers used on exterior concrete allow the passage of both air and moisture. Penetrating sealers are made of specialty resins such as silicones, siloxanes, and silanes that penetrate into the concrete and form a chemical barrier to water, oil, and other common contaminants.

Shown in FIG. 7 is a cross-sectional elevation of formation of a channel above crack. A user may select a tool and tool accessory for forming the channels. In embodiments, the tool may be selected from a group including drills, roto-hammers, impact drills, jack hammers, grinders, oscillating tools, vibrators, routers, saws, granite cutters, and concrete engraving tools.

Shown in FIG. 8 is a translating mount 202 which is engaged to a tool 204 which is adapted to roll upon the surface 12 to impart channels thereon.

As shown in FIG. 8, the mount 202 has an engagement position 206 which is adapted to connect with powered tool 208 which will move the engraving tool 201. The engagement position 206 shown herein, is a clamp 212 with compression fixing screw 214 which engages around the power tool 208 rearward of the chuck 216 which holds the engraving tool 210. This configuration of the mount 202 works well with hammer drills, drills, and similar power tools 208.

A rack and pinion 218 allows for translation of the distal end of the engraving tool 210 toward and away from the surface 12 to render deeper or shallower channels 144, and for lifting the distal end of the engraving tool 210 above the surface 12 to move it to another point to be channeled. A drive gear 220 allows for this translation by hand rotation or motorized rotation as in the mode of the system herein in FIG. 13. Locks 22 can be used to fix the position.

Shown in FIG. 9, is the same translating mount 202, but which also includes a biasing mechanism 223 which will bias the engraving tool 210 into the surface 12, but which will allow for the engraving tool 210 to retract if the bias is overcome such as would occur when an obstacle is encountered. The configuration of the mount 202 as in FIGS. 8 and 9, allows the user to employ their own power tool 20 and engage it with the mount, and thereby use the same tool for other purposes. The configuration of the engagement position 206 can be changed to adapted the engagement position 206 for operative engagements with other types of power tools 208 and such is anticipated within the scope of this patent. Also, in FIGS. 8 and 9 is depicted a control cable 203 for the powered tool which can be employed to control the rotation and speed of the tool 210 from a remote location. In another embodiment, the tool could be configured to operate via commands received wirelessly as could be implemented by those skilled in the art. In another embodiment, control buttons (not shown but well known) on the tool 208 itself, can be employed.

Figure 10:
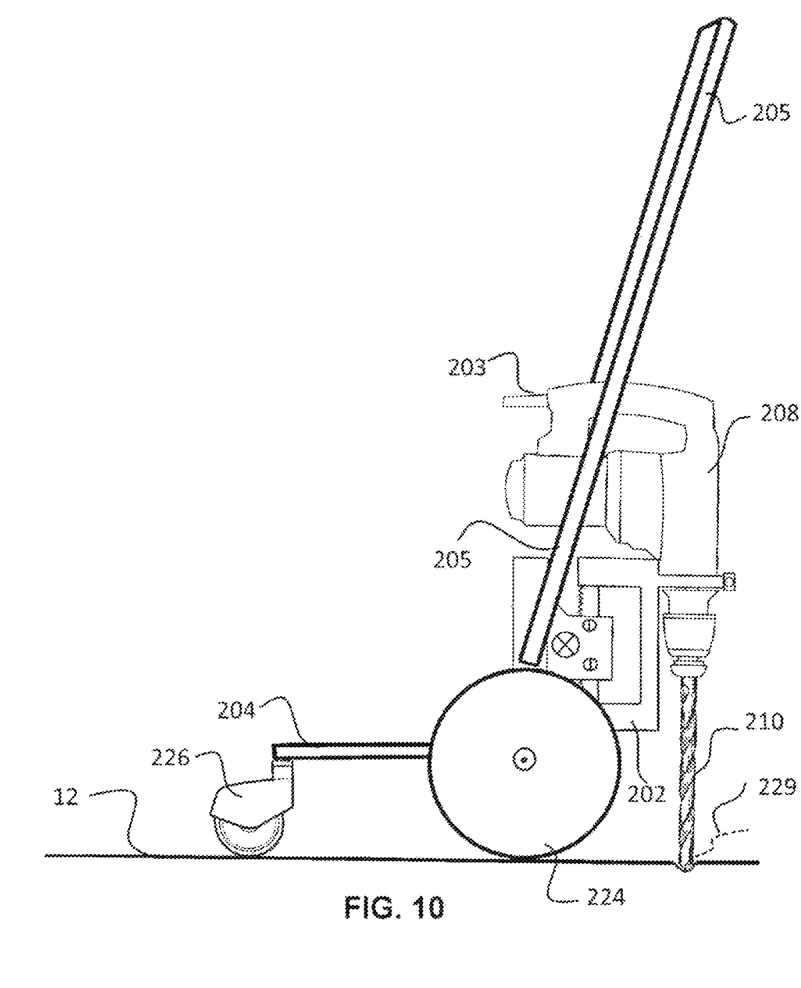
FIG. 10 shows a manually operated tool used in combination with the mount engaged with the power tool.

Shown in FIG. 10 is a mode of the system herein, allowing for a user to pull the engraving tool 208 and form channels into the surface 12. As depicted the tool has a pair of wheels 224 located on a side of the tool 204 from which a handle 205 projects. A rotating wheel 226 is located on the end opposite the handle 205. This configuration has been found to be the easiest for a user to employ in forming the channels in the surface 12 as it allows the user to view the too accessory 210 from above while pulling the handle 205 during use.

As depicted in FIG. 11, a perimeter 230 of a surface 232 comprised of pre-existing fissures 10 is shown. In embodiments, surface 232 is embodied as a cracked driveway, patio, or pedestrian walkway. Although the surface 232 is depicted in a horizontal orientation, the scope of the present invention is intended to apply to surfaces and fissures formed in vertical surfaces, for example, but not limited to: walls, retaining walls, and wainscoting. In one embodiment, fissures 10 are located via an optical detector or scanner positioned over the surface. In one embodiment, the optical detector or scanner is used to obtain a 2D or 3D image of the surface, which is subsequently stored in a memory, and data from the image is analyzed by software and processor to determine and store the location of the fissures and/or locations of the perimeter, and/or other features. In embodiments, the optical detector, memory, software and/or processor can be implemented as part of a tool used to form channels in the surface, or separately from the tool. In one embodiment, having determined locations of the fissures and/or perimeter, the software can be used to determine the locations of one more channel that will subsequently be formed in the surface. In one embodiment, the location and other information can be displayed on a monitor associated with the processor. In one embodiment, channel locations are determined using the location of the fissures and/or perimeter as reference points. In one embodiment, having determined the desired location of the one or more channel, the desired location is used to move the tool over the surface along a path to form the one or more channel. In one embodiment, the desired location of the channels is determined in a manner such that the surface will no longer be comprised of only preexisting cracks, but as well subsequently formed channels that complement the cracks to give the overall appearance of the surface a more aesthetic look and feel. In one embodiment, the tool is driven according to GPS coordinates of features determined at the time an image of the surface is obtained. In one embodiment, the software is used to generate a guide that can be implemented optically or as a separately implemented template having a pattern corresponding to channel locations and that can be overlaid over the surface, where the guide can be subsequently followed by the tool in an automated or manual manner. In one embodiment, a guide for the channels can be manually created by a user, for example, as a plurality of lines that are drawn on the surface and that extend from the preexisting fissures, which lines can be used by the user to manually drive the tool along the lines to form the channels.

As depicted in FIG. 12, a surface comprised of preexisting fissures 10 and channels 229 as described with reference to FIG. 11 is shown. Using an image, guide, software, processor, and/or other means as described above, an actual or virtual guide may be used to direct a tool to create channels 229 in surface 230.

In one embodiment, once the position of the channels 229 is determined, a guide may be formed to guide the tool 208 in FIG. 10. In a manual mode, the tool may be driven according to directions provided by the guide. In one embodiment, a guide can be provided upon the surface by projecting an image of comprised of lines that represent positions of channels to be formed.

Figure 13:
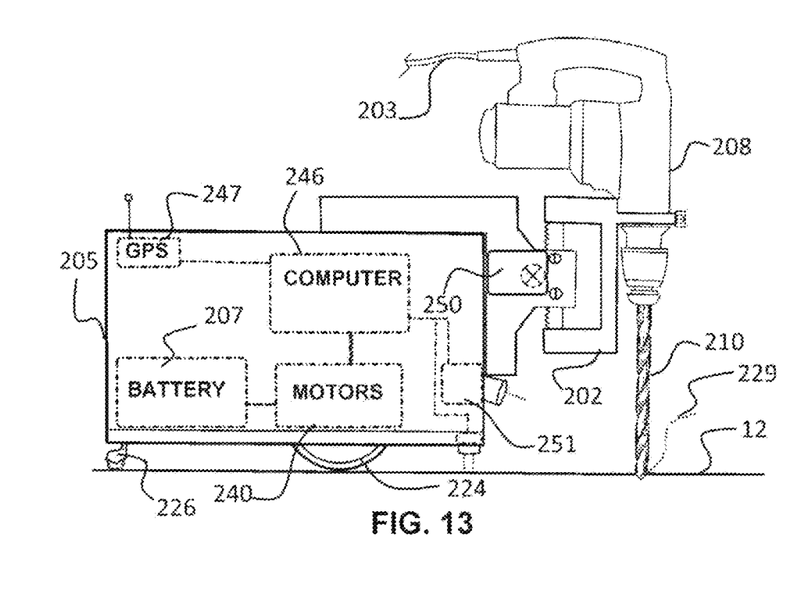
FIG. 13 shows a powered tool which comprises a tool accessory attachment in operative engagement with the surface to impart the channels.
Figure 14:
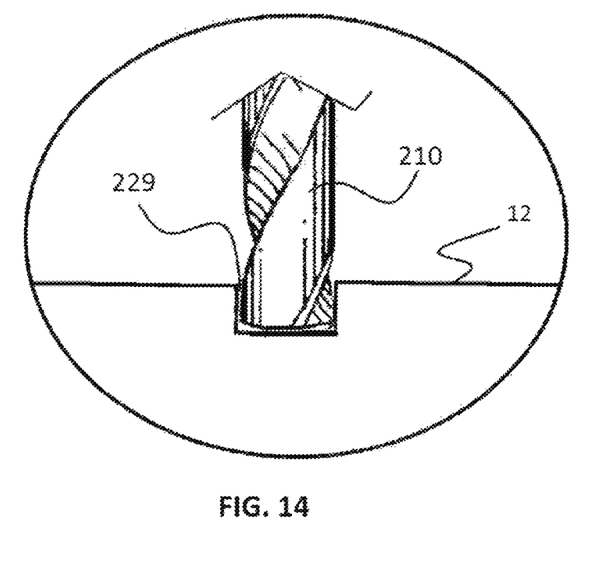
FIG. 14 depicts a distal end of an engraving tool forming a channel in an uncracked portion of a surface.

In a preferred mode of the system shown in FIG. 13, a mount 202 is engaged with a tool 208 and a tool accessory 210 of choice is engaged with a self-propelled tool 205. As shown the self-propelled tool 205 has wheels 224 which are operatively engaged with electric motors 240 that propel the tool 205 forward and rearward and in turns required, to follow a guide held in a memory of computing device 246, where the guide is representative of channels 229 to be formed. Positioning of the tool accessory 210 upon the surface to impart the channels according to the guide is handled by motors 240 which are controlled by the computer 246. In embodiments, tool accessory may comprise a drill, a grinder, an impactor, a cutter, a bit, a saw or other accessory compatible for use with a tool 205 and capable of creating additional channels on a cracked surface.

Self-propelled tool 205 can start from a known position upon the surface 12 which may either be input to the computer 246, or determined using an electronic location sensor such as a GPS receiver 247 communicating the terrestrial position of the tool 205 to the computer 246 which will use that information to drive the tool 205 using the motor or motors 240 on the surface. This mode of the method and device herein, like the others will allow the user to mount an existing power tool 208 on the mount 202. As shown in FIG. 13, mount 202 may have an electric motor 250 rotating the drive gear 220 of the rack and pinion 218 to cause the distal end of the tool 210 to move deeper and shallower into the surface 12, and to raise above the surface 12 when changing positions. This electronic driven rack and pinion 218 allows for translational positioning of the tool accessory 210.

It should be noted that while the method and apparatus herein is described for imparting channels 229 or channels in a surface that is generally horizontal, it could be employed to impart indicia into vertically disposed surfaces using either a tool 204 or 205 which is supported to move in a vertical orientation, or, by positioning an moveable arm (not shown) in between the tool 204 or 205 and the mount 202. Where the computerized system is employed similar to that of FIG. 13, a robotic arm (not shown) could be engaged between the self-propelled tool 205 and the mount 202, and thereby move the mount 202 vertically while controlling the translation of the tool accessory 210. In this fashion indicia can be imparted to vertically disposed stone and cementitious surfaces.

The present subject matter is not limited to the specific methods stated above. Other options for creating an appearance of authentic set-stone on a masonry or concrete may use selected subsets of the steps described above. Preference and budget will dictate which steps should be used. Areas of high visibility will be most appealing and authentic if more steps are performed.

In a more rigorous method the user will:

1. Grind or scarify surface where necessary for evenness and safety.
2. Create channel in existing cracks if desired; and if not, then create control joints to limit future cracking.
3. Place stop channels, cardboard furring strips, foam (or other material that can be removed easily after overlay and texturing procedure).
4. Prepare surface using recommended materials for optimal performance of overlay material.
5. Apply overlay and stamp or texture which may be tinted with coloring.
6. Apply colors to desired result.
7. Apply sealer to protect color work from being clouded by grout material. This makes for easier cleanup after grouting.
8. Outline desired patterns to be turned into channels. This can be accomplished by scoring lines, chalking, taping, or other. An experienced artist can perform this task without using outlines and can achieve a desired appearance.
9. Use power tool to create complimentary additional channels that will be grouted.
10. Apply grout and use typical grout-cleanup methods commonly used.
11. After grout is cured, another coat of sealer is applied.

In a more basic method than those described above, the user will:

1. Grind or scarify a cracked surface only if necessary for evenness and safety.
2. Apply color to surface for desired result.
3. Apply sealer to protect color work from being clouded by grout material. This makes for easier cleanup after grouting.
4. Instead of creating deep channels with invention, use at shallow depth to create the appearance of grout rather than actually applying grout. This does not yield as authentic a result as actually applying grout does, but allows a 'quick-fix' and saves a lot of work. Further, when rendering indicia into the surface which is a photo or drawing or the like, the channels may simply be small dot-like channels formed into the surface which when viewed from afar, appear as the intended photo image or drawing.

Finally, in a simple but effective method of the system herein, a) a position of preexisting fissures is determined upon the surface;
b) placement positions for channels is determined which in combination with the fissures, will form the desired image or indicia into the surface;
d) a guide is employed to impart the channels according to the placement positions on the surface using a powered tool to form the channels in the placement positions;
e) if desired, the original fissures and/or channels may be filled with filler material.

In employing the guide to impart the channels to the surface, the user may use a wheeled tool to pull the powdered tool, or if a robotic tool is employed, a computer navigation system on the tool will drive and steer the tool, to form the channels using the guide which is stored in electronic memory.

While all of the fundamental characteristics and features of the surface repair and remediation system herein have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that upon reading this disclosure and becoming aware of the disclosed novel and useful device and system herein disclosed, that various substitutions, modifications, and variations may occur to and be made by those skilled in the art, without departing from the spirit or scope of the invention. Further, the accompanying drawings, which are incorporated herein and form a part of the specification, illustrate some, but not the only or exclusive examples of embodiments and/or features of the invention. It is intended that the embodiments and figures disclosed herein are to be considered illustrative, rather than limiting. Consequently, all such modifications and variations and substitutions, as would occur to those skilled in the art are considered included within the scope of the invention as defined by the following claims.

The invention claimed is:

1. A concrete or cementitious product defined by a surface area comprised of:
   a plurality of pre-existing fissures formed by an expansion or contraction of the surface area;
   a plurality of decorative channels formed separately by a machine, wherein each of the plurality of decorative channels comprise a length and a width, wherein along the length each of the plurality of decorative channels are defined by an intersection of the surface area and two opposite sidewalls that extend up from below the surface area toward the surface area, and wherein the intersection is configured by the machine to define a rough or rounded corner along the length.

2. The surface of claim 1, wherein the machine is selected from the group consisting of an impact drill, a jack hammer, and a rotary hammer.

3. The surface of claim 2, wherein at least one of the plurality of decorative channels extends from at least one of the plurality of pre-existing fissures.

4. The surface of claim 3, wherein at least one of the plurality of pre-existing fissures and at least one of the plurality of decorative channels define a continuous border, wherein the continuous border is non-linear over the length of the rough or rounded corner of at least one of the plurality of decorative channels.

5. The surface of claim 3, wherein the surface comprises a plurality of shapes configured to appear as a plurality of set stones, each of the plurality of shapes being enclosed by a continuous border that is defined by at least one of the plurality of pre-existing fissures, and wherein at least two of the plurality of shapes share at least a portion of their respective continuous border.

6. The surface of claim 4, wherein the continuous border defines a shape that is enclosed by the continuous border.

7. The surface of claim 1, wherein the surface area is a residential driveway, a residential patio, and/or a residential sidewalk.

8. The surface of claim 1, wherein the plurality of pre-existing fissures and the plurality of decorative channels define respective volumes, and wherein the volumes are filled with a filler.

9. A concrete or cementitious product defined by a surface area comprised of:
   a plurality of pre-existing fissures formed by an expansion or contraction of the surface area;

a plurality of decorative channels formed separately by a machine, wherein each of the plurality of channels comprise a length, wherein each of the plurality of decorative channels are defined by an intersection of the surface area and two opposite sidewalls that extend below the surface area, and wherein at least some of the two opposing sidewall surfaces are configured by the machine to be irregular or rough.

10. The surface of claim 9, wherein the machine is selected from the group consisting of an impact drill, a jack hammer, and a rotary hammer.

11. The surface of claim 10, wherein at least one of the plurality of decorative channels extends from at least one of the plurality of pre-existing fissures.

12. The surface of claim 11, wherein at least one of the plurality of pre-existing fissures and at least one of the plurality of decorative channels define a continuous border, wherein the continuous border is non-linear over the length of the rough or rounded corner of at least one of the plurality of decorative channels.

13. The surface of claim 11, wherein the surface comprises a plurality of shapes configured to appear as a plurality of set stones, each of the plurality of shapes being enclosed by a continuous border that is defined by at least one of the plurality of pre-existing fissures, and wherein at least two of the plurality of shapes share at least a portion of their respective continuous border.

14. The surface of claim 12, wherein the continuous border defines a shape that is enclosed by the continuous border.

15. The surface of claim 9, wherein the surface area is a residential driveway, a residential patio, and/or a residential sidewalk.

16. The surface of claim 9, wherein the plurality of pre-existing fissures and the plurality of decorative channels define respective volumes, and wherein the volumes are filled with a filler.

* * * * *